United States Patent [19]

Bateman et al.

[11] Patent Number: 4,646,244

[45] Date of Patent: Feb. 24, 1987

[54] TERRAIN ADVISORY SYSTEM

[75] Inventors: Charles D. Bateman, Bellevue; Michael M. Grove, Kirkland, both of Wash.

[73] Assignee: Sundstrand Data Control, Inc., Redmond, Wash.

[21] Appl. No.: 576,450

[22] Filed: Feb. 2, 1984

[51] Int. Cl.$^4$ .............................................. G08G 5/04
[52] U.S. Cl. ................................... 364/461; 340/963; 342/65
[58] Field of Search ............... 364/461, 462, 449, 439, 364/433, 457, 562, 436, 450, 453; 343/7 TA, 5 MM, 7 ED, 12 A, 112 CA; 340/961, 971, 973, 979, 990, 995, 963

[56] References Cited

U.S. PATENT DOCUMENTS

| | | | |
|---|---|---|---|
| 4,063,073 | 12/1977 | Strayer | 364/439 |
| 4,224,669 | 9/1980 | Brame | 364/433 |
| 4,360,876 | 11/1982 | Girault et al. | 364/449 |
| 4,369,425 | 1/1983 | Andersen et al. | 364/461 X |
| 4,495,580 | 1/1985 | Keearns | 364/450 |

Primary Examiner—Errol A. Krass
Assistant Examiner—Thomas G. Black
Attorney, Agent, or Firm—Mason, Kolehmainen, Rathburn & Wyss

[57] ABSTRACT

A terrain advisory system utilizes stored data representative of terrain and other obstacles in predetermined geographical areas of interest to provide advisory warnings of the proximity of terrain, obstacles and restricted areas as they are approached. When used in a vehicle such as an aircraft, the system monitors the position, altitude, ground speed, ground track and the vertical speed of the vehicle and provides advisory indications of the position and path of travel of the vehicle with respect to obstacles and terrain. Such advisory indications may take the form of voice warnings describing the nature and position of any obstacles, or a visual display showing the position of the obstacles and terrain with respect to the vehicle.

77 Claims, 14 Drawing Figures

TERRAIN ADVISORY SYSTEM

TECHNICAL FIELD

This invention relates generally to systems for advising the pilot of a vehicle such as an aircraft or a submarine of the proximity of obstacles or terrain in the path of the vehicle, and more particularly to navigationally based terrain advisory systems that advise of the presence of terrain or other obstacles in the vicinity of the vehicle based on navigationally derived position as well as altitude, ground speed, ground track and vertical speed of the vehicle.

BACKGROUND OF THE INVENTION

Various systems that provide warnings or advisory indications of the presence of terrain or obstacles are known. Among those systems include systems generally known as ground proximity warning systems for aircraft. Such systems mohitor the flight conditions of an aircraft and provide a warning if the flight conditions are such that an inadvertent contact with the ground is imminent. Among the flight conditions monitored by such systems are radio altitude and rate, barometric altitude and rate, airspeed, and flap and gear positions. The aforementioned parameters are monitored, and an advisory indication or a warning is generated when the relationship between the aforesaid conditions or parameters is such that ground impact is likely to occur. Typical examples of such systems are disclosed in U.S. Pat. Nos. 3,715,718, 3,925,751, 3,934,221, 3,934,222, 3,936,796, 3,944,968, 3,947,808, 3,947,810, 3,958,218, 3,958,219, 4,016,565, 4,030,065, 4,058,710, 4,060,793, 4,067,520, 4,071,894, 4,093,938, 4,107,681, 4,112,413, 4,121,287, 4,122,529, 4,135,143, 4,189,777, 4,215,334, 4,293,840, 4,319,218, 4,336,976 and 4,369,425, and Canadian Pat. No. 1,033,828.

While the above-described systems provide advisory and warning signals in the event of proximity to terrain, such systems generate warnings based solely on the flight conditions of the aircraft, and do not utilize navigation information. Consequently, the sensitivity of such systems must be adjusted to provide adequate warnings when a hazardous flight condition exists without generating false or nuisance warnings when there is no danger. Such an adjustment results in a compromise that may still cause nuisance warnings when flying over terrain unique to particular geographic areas and reduced warning times in other areas. One approach to improve the performance of such systems has been to modify the warning envelopes of the ground proximity warning system in accordance with the geographic location of the aircraft in order to optimize the warning criteria for the particular geographic area over which the aircraft is flying. An example of such a system is described in U.S. patent application Ser. No. 448,862, filed Dec. 10, 1982 by Bateman, et al. and assigned to the same assignee of the assignee of the present invention. In the system disclosed in the aforesaid application, the warning criteria are optimized to suit the terrain characteristics about various geographic areas, particularly the airports from which the aircraft is taking off or landing.

Another approach utilizing a geographical input is disclosed in U.S. Pat. No. 4,224,669. In the system disclosed in the aforesaid patent, a memory device is employed to store minimum safe altitudes by geographic coordinate areas. A navigational computer is used to determine the position of the aircraft, and a warning is given if the aircraft descends below the stored minimum safe altitude for the coordinate area in which the aircraft is flying. The system has a "worst case" and a "tactical" mode of operation. In the "worst case" mode, the minimum safe altitude is determined as a function of the highest terrain feature or obstacle within the geographic coordinate area of interest. In the "tactical" mode of operation, current flight conditions such as position, ground speed and ground track are used to define a minimum safe altitude based on the heights of terrain and obstacles immediately ahead of the projected flight path.

While these systems do provide warnings of the proximity of terrain or obstacles, none of the above-described systems provides information relating to the exact location or nature of the terrain or obstacle, nor of the type of action required to avoid the obstacle. Thus, when a warning representative of the proximity of terrain, or of a descent below a minimum safe altitude is provided by the above systems, the evasive action that is normally called for is for the pilot to pull up. While pulling up may be sufficient evasive action to avoid impact in many or most cases, there are cases where turning right or turning left in addition to or instead of pulling up would provide a greater margin of safety.

SUMMARY OF THE INVENTION

Thus, it is an object of the present invention to provide a terrain or obstacle advisory system that improves the performance of ground proximity warning systems.

It is another object of the present invention to provide a terrain or obstacle advisory system that provides an indication of the nature and location of obstacles and terrain in the vicinity of the vehicle.

It is yet another object of the present invention to provide a terrain advisory system that provides terrain avoidance guidance to the pilot.

It is another object of the invention to provide a system that advises the pilot of an aircraft of flight into a restricted area.

It is yet another object of the present invention to provide aural terrain avoidance guidance to the pilot.

It is another object of the present invention to provide a visual display of terrain and obstacles.

It is yet another object of the present invention to provide a terrain advisory system that predicts the flight path of an aircraft with respect to obstacles or terrain and provides an alert if the flight path of the aircraft is such that it is likely to result in an impact with the terrain or an obstacle within a predetermined time interval.

It is yet another object of the present invention to provide a warning system that provides longer warning times than those provided by the prior art systems.

It is yet another object of the present invention to provide a terrain advisory system capable of providing several minutes of warning time of an impending impact with terrain or an obstacle.

It is yet another object of the present invention to provide a terrain advisory system that minimizes the number of nuisance warnings generated.

It is yet another object of the present invention to provide a system that stores geographical features of terrain as well as the location of manmade obstacles, and retrieves the stored terrain and obstacle information to provide an alert in the event of close proximity to the terrain or an obstacle.

It is yet another object of the present invention to provide a system that minimizes the memory capacity required to store the terrain and obstacle information.

It is yet another object of the present invention to alter the warning criteria required for the system to generate a warning as a function of the ground track, ground speed and vertical speed of the aircraft.

It is yet another object of the present invention to provide a system that predictively "looks ahead" of the vehicle without using forward looking radar.

It is still another object of the present invention to provide a system that "looks ahead" of the vehicle by utilizing navigation information and stored terrain and obstacle data to predict a flight path and to display any obstacles or terrain within the predicted flight path.

Thus, in accordance with a preferred embodiment of the invention, geographical data representative of terrain and other obstacles, both natural and manmade are stored in memory as a function of geographic location. In addition, the boundaries of restricted areas, such as, for example, military installations may also be stored in the memory. In order to minimize the amount of storage required to store the terrain and obstacle information, the shapes and contours of the terrain and obstacles are approximated by simple geometric shapes such as cones, connected cones, inverted cones and other simple shapes that can be defined by a few bits of information. This permits a mountain or a mountain range to be defined by a very few bits defining the height and slope of a cone or connected cones. Alternatively, the shapes may be defined algebraically, but geometric shapes are preferable because they are easier to manipulate mathematically.

A navigation system which may include, for example, a flight management system that receives signals from, for example, an inertial navigation system and other signals such as signals from a satellite navigation receiver, VLF/OMEGA, Loran C, VOR/DME, and DME/DME, is employed to determine the present latitude and longitude of the aircraft. If no flight management system is used, the signal may be obtained from the various navigation systems directly. Search logic that is responsive to the latitude and longitude signals is used to retrieve data representative of the terrain in the vicinity of the present position of the aircraft.

A predictive terrain/obstacle warning envelope generator receives the terrain representative data as well as data representative of the ground speed, ground track, altitude and vertical speed of the aircraft to generate a warning envelope which is a function of aircraft speed, ground track, altitude and vertical speed. In addition, the size of the envelope may be tailored to provide any desired warning time. The point of reference may be selected so that the envelope is defined either about the aircraft, or about the various obstacles. If the warning envelope is defined about the aircraft, a warning or an advisory is generated each time an obstacle penetrates the warning envelope. If the envelope is defined about the terrain or obstacle, the warning is generated whenever the position of the aircraft is such that it penetrates the envelope.

In order to determine whether the envelope is penetrated, the envelope signal from the predictive terrain/obstacle warning envelope generator is compared with the position of the aircraft or of the terrain/obstacle, and an advisory is issued when the envelope is penetrated. In addition, data from the envelope generator may be used to control a voice generator and a visual display. The voice generator may be programmed to instruct the pilot of the type and location of the terrain or obstacle and the type of action required to avoid it. The data may also be presented visually either in the form of a map display or an attitude display to permit the pilot visually to fly around the terrain/obstacle or restricted area.

DESCRIPTION OF THE DRAWING

These and other objects and advantages of the present invention will become readily apparent upon consideration of the following detailed description and attached drawing wherein.

DETAILED DESCRIPTION OF THE PREFERRED EMBODIMENT

Figures 1, 2, 3:
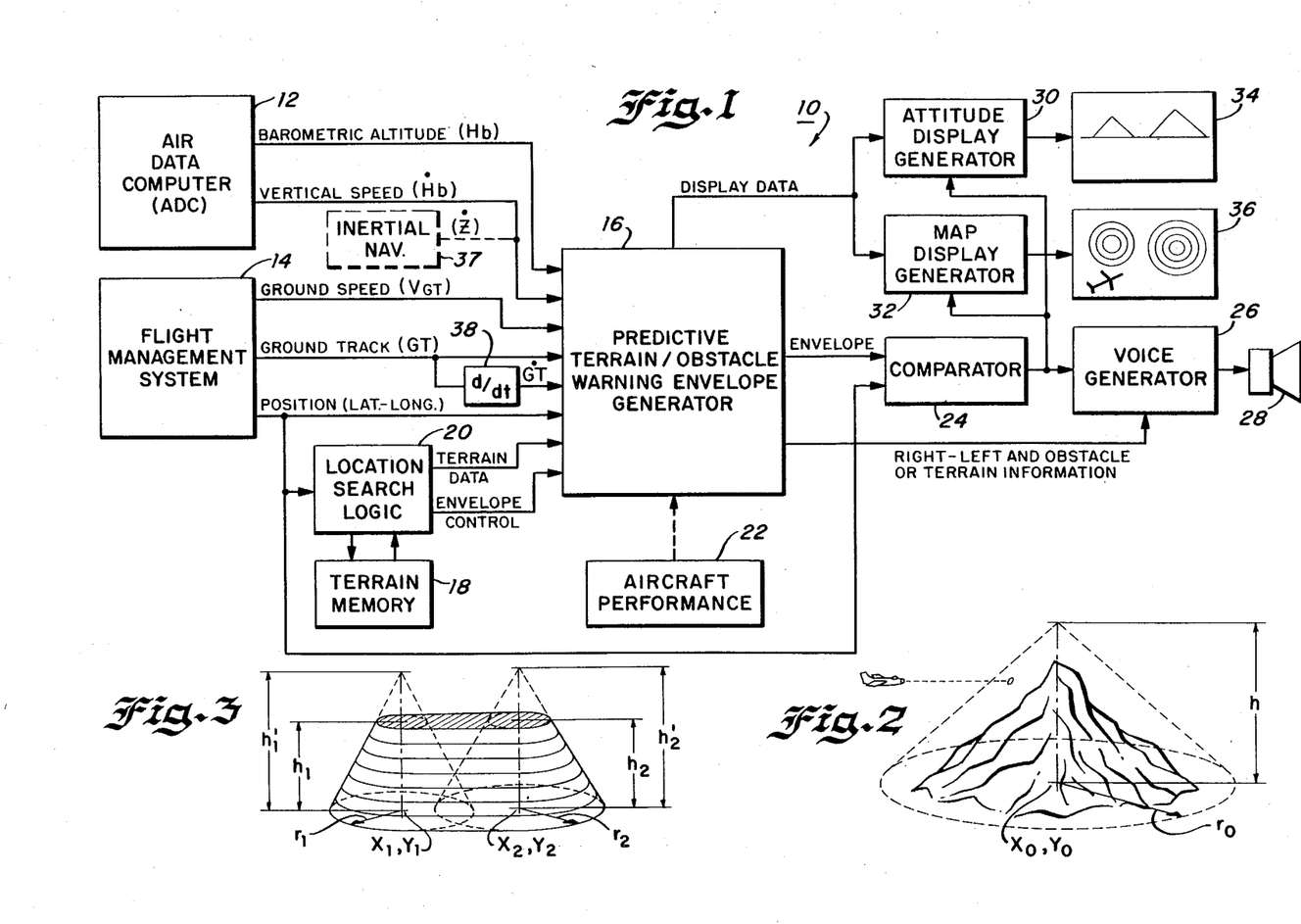
FIG. 1 is a block diagram of a preferred embodiment of the terrain/obstacle advisory system according to the invention.
FIGS. 2 and 3 illustrate how terrain features are approximated by simple geometric shapes by the system according to the invention.

Referring now to the drawing with particular attention to FIG. 1, there is illustrated a preferred embodiment of the system according to the invention generally designated by reference numeral 10. Although the system according to the invention is illustrated as a series of functional blocks for purposes of clarity, it is to be understood that the actual implementation of the system may be other than that specifically shown in FIG. 1, with various analog and digital implementations being possible. The system 10 according to the invention utilizes data from an air data computer 12 or from a barometric altimeter and rate circuit present on the aircraft and from a navigation system which may include a flight management system 14, also present in the aircraft, in order to determine the location of the aircraft and to advise the pilot of dangerous proximity to terrain or to other obstacles. Alternatively, the navigation data may be obtained directly from the navigation system, which may include an inertial navigation system, a satellite navigation receiver, VLF/OMEGA, Loran C, VOR/DME or DME/DME, particularly when no flight management system is used.

In the discussion of the present invention, the system will be discussed in an aircraft environment; however, the system is also usable for other vehicles that must navigate around terrain, such as, for example, submarines. The signals from the air data computer 12 and flight management system 14 are applied to a predictive terrain/obstacle warning envelope generator 16 along with terrain data which is retrieved from a terrain memory 18 by location search logic 20. A system particularly suitable for the search logic 20 is disclosed in U.S. patent application Ser. No. 560,073 filed on Dec. 9, 1983 by Lyle James Noland entitled "Ground Proximity Warning System Geographic Area Determination", but other search logic may be used. In addition, envelope control data is applied to the envelope generator 16. Data representative of the climb performance of the aircraft is also applied to the envelope generator 16 from an aircraft performance input 22. The envelope generated by the envelope generator 16 is compared with the position (latitude and longitude) of the aircraft provided by the flight management system 14 by a comparator 24 that compares the envelope and position signals. The comparator 24 illustrated in FIG. 1 may be a comparator that compares, for example, voltages or currents, or simply a summing junction. In a digital system, a digital comparator may be used.

The comparator 24 controls a voice generator 26 which generates a voice advisory signal and applies it to a transducer 28, which may be part of the cockpit communication system in order to provide an advisory indication of the presence of terrain or obstacles whenever the envelope generated by the envelope generator 16 is penetrated. In addition, the envelope generator causes the voice generator 26 to advise the pilot of the nature and location of the terrain or obstacle by selecting the appropriate message to indicate to the pilot whether he should turn left or right, and whether the object is terrain or a man-made obstacle. In addition, display data is generated by the warning envelope generator and applied to an attitude display generator 30 and a map display generator 32 which generate attitude and map displays that are applied to a pair of displays, such as cathode ray tubes 34 and 36. The attitude display displays an image showing the terrain and obstacles that lie in the flight path forward of the aircraft. The map display displays the same terrain below the aircraft. A signal from the comparator 24 is also applied to the display generators 30 and 32 to permit them to indicate a hazardous condition visually, for example, by a change in color. A system suitable for providing such displays is described in Aviation Week and Space Technology, Sept. 12, 1983, pages 88-95. Other systems suitable for providing such displays are multifunction displays that provide, for example, a map display that shows the position of the aircraft relative to a navigational waypoint and a weather radar display. Such displays are presently used on modern transport aircraft such as the Boeing 757 and 767 aircraft and the European A310 Airbus.

In operation, the air data computer 12 provides signals representative of the barometric altitude, or height above sea level, of the aircraft and the vertical speed of the aircraft in the form of a barometric rate signal $H_b$ to the predictive terrain/obstacle warning generator 16. Alternatively, the vertical speed signal may be a Z-velocity signal obtained from an inertial navigation system 37.

The flight management system provides signals representative of ground speed and the ground track of the aircraft to the envelope generator 16. In addition, the ground track signal, which is a vector representing the direction of the aircraft along the ground is differentiated by a differentiator 38 and applied to the envelope generator 16 to provide information to the envelope generator 16 representative of changes in direction of the aircraft. A position signal representing the latitude and longitude of the aircraft is also applied to the generator 16 as well as to the location search logic 20. The location search logic 20 is responsive to the position signal and causes data representative of terrain within a predetermined distance from the position of the aircraft to be retrieved from the terrain memory 18 and applied to the envelope generator 16. The envelope generator 16 responds to the various altitude, position, track and speed signals to generate the various display data, and to advise the pilot of the proximity of terrain and obstacles. The operation of the envelope generator will be discussed in greater detail in a subsequent portion of the detailed description.

In order for the system to operate, data representative of the terrain and obstacle around predetermined critical geographic areas such as, for example, airports and restricted areas, must be stored. In addition, it is desirable to store data representative of potentially dangerous terrain, such as, for example, mountain ranges. However, in order to store data representative of such terrain and obstacles would require an inordinate amount of memory capacity in the terrain memory 18. Consequently, some form of data compaction must be provided.

Therefore, in accordance with an important aspect of the present invention, rather than storing all of the irregularities and insignificant features of terrain and obstacles, the terrain and obstacles can be approximated by a series of standard shapes that can readily be defined by a few bits. These standard shapes may include simple geometric shapes such as cones, truncated cones, connected cones and other simple shapes that can be defined by a few bits. Algebraic shapes such as quadratic surfaces and other surfaces that may be readily defined by an algebraic equation may also be used. Preferably, geometric shapes are used as the standard shapes, and mountains, for example, may readily be approximated by cones as shown in FIG. 2. The size, shape and location of such cones may be defined by only four numbers, for example, the height above sea level of the peak of the cone, h, the radius of the base of the cone, r, and the latitude and longitude of the center of the cone, $X_o$, $Y_o$. Similarly, mountain ridges may be defined by two or more connected cones as is shown in FIG. 3. For flat-topped mountains and for plateaus the cones may also be truncated as in FIG. 3. Thus, the plateau illustrated in FIG. 3 can be defined by only 10 numbers, namely the truncated and untruncated heights of the cones, $h_1$, $h_1'$, and $h_2$, $h_2'$, the radii of the bases of the two cones $r_1$ and $r_2$, and locations of the centers of the cones $X_1$, $Y_1$ and $X_2$, $Y_2$. Restricted areas, such as, for example, military installations may be stored as a geographical boundary 40 (FIG. 3A) or an approximation thereof and an imaginary wall 42 defined around the boundary 42. The wall 42 may extend to a minimum flight ceiling 44 above which flight is permitted, or may simply define a restricted area boundary that must not be penetrated at any altitude.

Minimum safe altitudes about a plateau 46, for example, a plateau containing an airport, may be defined by an inverted cone 48 (FIG. 3B) or by connected inverted cones. In such instances, the slope of the sides of the cone 48 would be selected such that the sides of the cone clear surrounding obstacles and terrain, or so that they approximate the angle of the glide slope beam.

Once the terrain and obstacle data has been stored in the terrain memory 18, such data can be utilized to warn the pilot if he approaches the terrain or obstacles too closely. There are many criteria for determining what distance is too close to an obstacle or terrain. For example, if a pilot is flying alongside or away from a mountain, he may safely approach much closer than if he were flying toward the mountain. Similarly, if the pilot is approaching a mountain at a relatively high altitude, he may safely approach the mountain more closely than if he were flying at a lower altitude.

Therefore, it has been found advantageous to define the safe approach distances as a function of the various flight conditions of the aircraft. For example, it is possible to define an envelope that defines a constant time to impact such as, for example, 90 seconds. Such an envelope would be defined as a function of altitude above sea level, vertical speed, ground speed and ground track and the desired time to impact. The envelope could be defined around each obstacle or terrain feature; and whenever the aircraft penetrated the envelope a warning or advisory indication would be given. Such a system has the advantage that any warning time could be selected, and consequently longer warning times than had previously been possible can be achieved. Moreover, knowing the warning time permits a pilot to adjust his course appropriately without having to take hasty and possibly ill-conceived evasive maneuvers. However, in some instances it has been found that a constant time to impact envelope is too sensitive and may cause nuisance warnings. Consequently, it has been found advantageous to modify the constant time to impact envelope to make it more sensitive when the aircraft is heading directly at an object, and less sensitive when the aircraft is passing by the object. Examples of such envelopes are discussed in a subsequent portion of the specification.

Figures 3A, 3B, 4, 5, 6, 7:
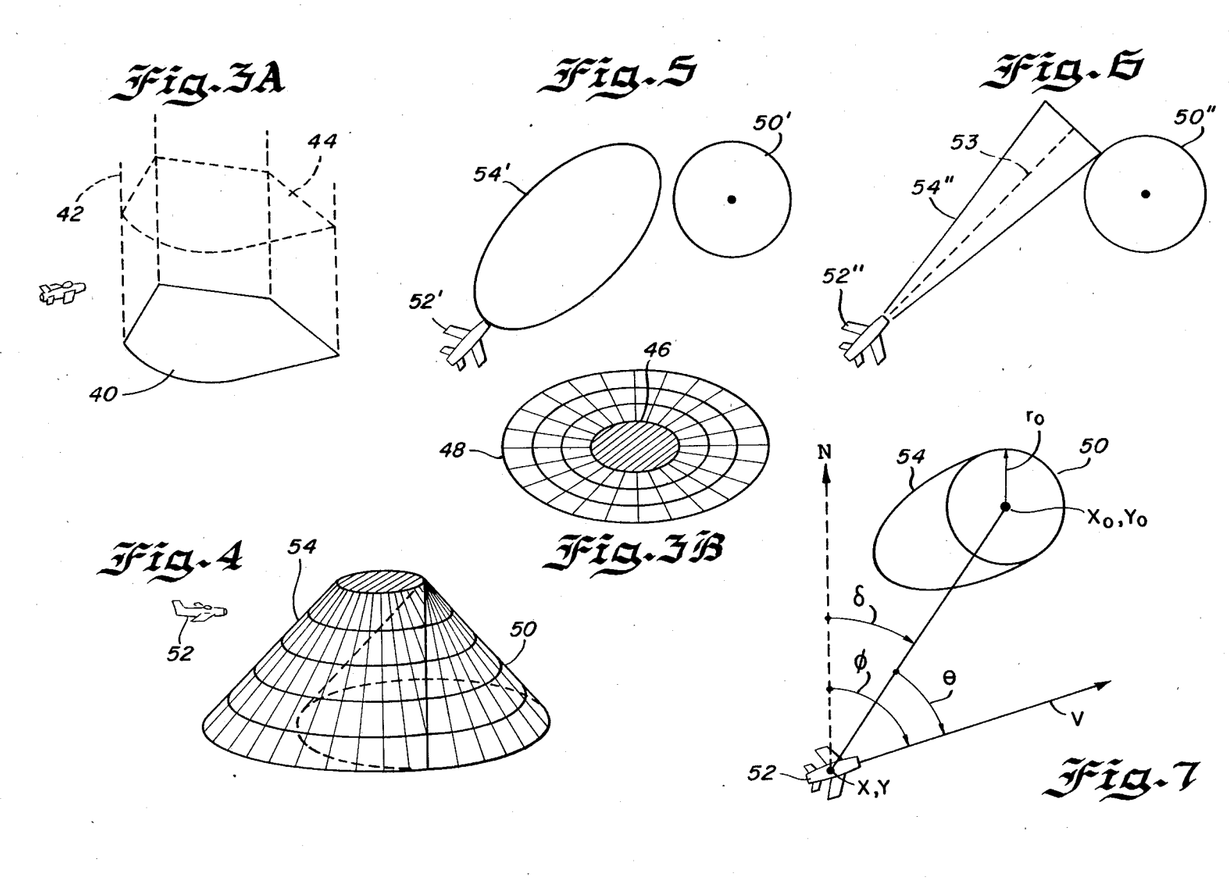
FIG. 3A illustrates how a restricted area may be defined.
FIG. 3B illustrates how an inverted cone may be used to define rising terrain about a plateau or an airport.
FIGS. 4-6 illustrate various approaches to deriving warning envelopes based on terrain/obstacle locations and aircraft position and flight parameters.
FIGS. 7 and 8 show how the geometric shapes defining the terrain obstacles may be expanded as a function of aircraft flight parameters to define a safe approach distance.

There are various ways to define envelopes that provide the desired warning criteria. Perhaps the easiest approach to understand conceptually is illustrated in FIG. 4. In FIG. 4, there is illustrated a cone 50 defining a terrain feature or obstacle that is being approached by an aircraft 52. In the example illustrated in FIG. 4, an envelope, for example, a constant time to impact envelope 54 may be defined about the cone 50. The envelope 54 is a dynamic envelope whose boundaries are a function of not only the shape of the cone 50, but also of the altitude above sea level, vertical speed, ground speed and ground track of the aircraft 52, as well as the desired time to impact. Thus, for an aircraft traveling at high speed, the boundary 54 extends farther from the cone 50 than for an aircraft traveling at low speed. Moreover, the direction of extension of the envelope 54 from the cone 50 is determined by the position and ground track of the aircraft. Because the envelope 54 is dynamic and defines the time to impact boundary as a function of both the characteristics of the cone 50 and the operating conditions of the aircraft 52, it is not necessary to predict the course of the aircraft 52. All that is necessary is to compare the position of the aircraft 52 with the boundary of the envelope 54, and to issue an advisory warning if the aircraft 52 penetrates the boundary 54.

Rather than referencing the constant time to impact envelope to a terrain feature or to an obstacle, the constant time to impact envelope may be referenced to the aircraft as shown in FIG. 5. In the system illustrated in FIG. 5, a warning envelope 54' is defined such that under the present flying conditions of an aircraft 52', any object within the envelope 54' will be struck by the aircraft within a predetermined time to impact time. As in the case of the envelope 54 (FIG. 4), the envelope 54' (FIG. 5) is a dynamic envelope defined by the operating conditions of the aircraft. Thus, the envelope 54' will be smaller for a lower speed aircraft than for faster aircraft. To determine whether a warning is to be given, the locations of the various terrain features and obstacles are compared with the boundary of the envelope 54', and an advisory warning is issued if the boundary of the envelope 54' is penetrated. In the system illustrated in FIG. 5, a warning is generated if the boundary 54' crosses the surface of the cone 50'. The criteria for determining the shapes of the envelope boundaries 54 and 54' illustrated in FIGS. 4 and 5 are described in greater detail in a subsequent portion of the detailed description.

Yet another approach to defining a warning envelope is illustrated in FIG. 6. In the embodiment illustrated in FIG. 6, a projected flight path 53 is predicted based on the current flying conditions of an aircraft 52". The length of the projected flight path 53 is determined by the desired time to impact, and its shape is determined by the flight conditions of the aircraft. An envelope 54" is defined about the projected flight path 53. The envelope 54" increases in width along the length of the projected flight path 56 to account for inaccuracies that occur in predicting flight paths over longer distances. The position of the envelope 54" is compared with the terrain features in the proximity of the projected flight path, and an advisory warning is given if the envelope 54" is penetrated. In the example illustrated in FIG. 6, if the surface of a cone 50" penetrates the envelope 54", an advisory warning will be issued.

One method of defining the envelope about terrain or an obstacle is illustrated in FIG. 7. In the illustration of FIG. 7, it is assumed that the aircraft 52 is flying level and at the radius of the cone 50, $r_o$, is the radius at the altitude at which the aircraft 52 is flying. The boundary of the warning envelope 54 is a function of the magnitude of the component of the aircraft speed in the direction toward the center of the obstacle or terrain multiplied by the desired time to impact. This velocity component can be obtained by knowing the relative position of the aircraft with respect to the obstacle as well as the ground track of the aircraft. In the illustration of FIG. 7, the heading of the ground track of the aircraft is obtained from, for example, the flight management system 14 of FIG. 1, and defined by the angle $\phi$. The position of the aircraft as defined by the latitude and longitude coordinates X and Y is obtained from the flight management system or from one of the navigation systems on the aircraft. The position of the peak of the cone 50, $X_o$, $Y_o$, and its radius, $r_o$, at the flight altitude of the aircraft 52 are obtained from the terrain memory 18. By taking the difference in the X-coordinates and the Y-coordinates of the aircraft and the center of the cone 50, the angle $\delta$ between the position of the aircraft and the position of the cone 50 can be calculated. Knowing the angles $\phi$ and $\delta$, the angle $\Theta$ may be calculated. The angle Θ is the angle between the path of travel and a straight line segment connecting the coordinates (for example, X and Y-coordinates) of the aircraft and the center coordinates of the cone. Knowing the angle Θ, the component of the velocity in the direction in the center of the cone 50 may be obtained by multiplication with the cosine of the angle Θ.

A constant time to impact warning envelope can readily be defined by multiplying the component of the velocity of the aircraft in the direction of the center of the cone 50 and adding it to the radius of the cone 50 at the altitude at which the aircraft is flying. This can be accomplished as follows:

$$f(\Theta) = r_o + V T \cos(\Theta)$$

which is equal to:

$$f(\Theta) = r_o + V T \cos(\phi - \delta)$$

which is equal to:

$$f(\Theta) = r_o + V T \cos[\phi - \arctan((X - X_o)/(Y - Y_o))]$$

wherein:
V = the velocity of the aircraft
T = the desired time to impact.

The equation defines the value of the envelope 54 only for the face of the cone 50 facing the direction of travel of the aircraft 52. Because there is no expansion of the envelope when the aircraft is traveling away from the terrain, $f(\Theta)$ is set to $r_o$ for values of Θ greater than or equal to 90°.

Although the above equations provide a constant time to impact function, the cosine function tends to slow down computation time, particularly when a relatively small microprocessor is used. In addition, as previously discussed, it is sometimes desirable to modify the constant time to impact envelope to reduce nuisance warnings or for other reasons. Thus, in order to simplify computation and to optimize the shape of the warning envelope, the cosine function is approximated by a linear function wherein the cosine term is replaced by the term (90−Θ)/90) to generate the following equation:

$$f(\Theta) = r_o + V T[(90 - \Theta)/(90)]$$

The above equation provides a close approximation to the envelope generated by the cosine function; however, square and square root functions may also be used to provide a broader or a narrower warning envelope, respectively.

In the square function, the envelope is defined by the following equation:

$$f(\Theta) = r_o + V T[(90 - \Theta)/(90)]^2$$

and in the square root function, the envelope is defined by the following equation:

$$f(\Theta) = r_o + V T[(90 - \Theta)/(90)]^{\frac{1}{2}}$$

Thus, the envelope may be tailored to provide either greater sensitivity to flybys in order to increase the warning time, or to provide a lesser sensitivity in order to reduce nuisance warnings.

Figure 8:
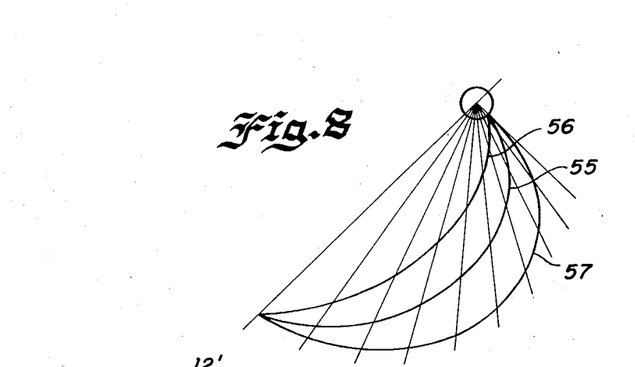

Examples of the linear, square and square root functions are illustrated by the graphs 55, 56 and 57, respectively, of FIG. 8. Presently, it appears that the square function provides the best results of the three equations.

Figure 9:
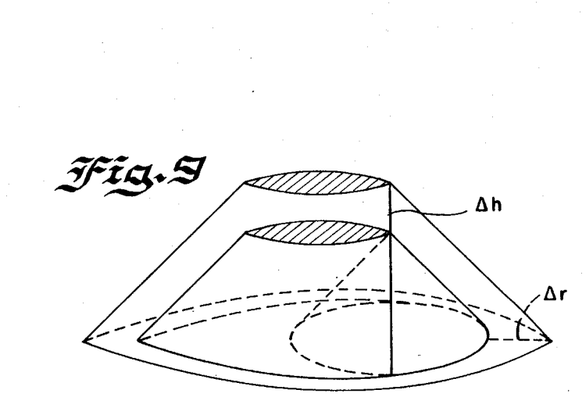
FIG. 9 shows an expansion similar to the expansions illustrated in FIGS. 7 and 8 in three dimensions.

The above described example assumed that the aircraft is flying in level flight. In the event that the aircraft is not flying in level flight, the warning envelope must be modified accordingly. This may be readily accomplished by raising and lowering the effective envelope as is illustrated in FIG. 9. This is accomplished by simply raising the height of the envelope by an amount Δh required to maintain the constant time to impact during descent conditions. The addition of Δh to the height of the envelope will result in an increase in the diameter, $\Delta r_o$, at the base of the cone. The values Δh and $\Delta r_o$ may be readily computed by the following equations:

$$\Delta h = k\, \dot{h}_b$$

$$\Delta r = \Delta h\, r_o/h_o$$

wherein:
k = a constant having units of time and is determined by the desired time to impact
$h_o$ = the initial height of the object prior to expansion.
$\dot{h}_b$ = the barometric descent rate or the Z-velocity or vertical velocity of the aircraft.

Figure 10:
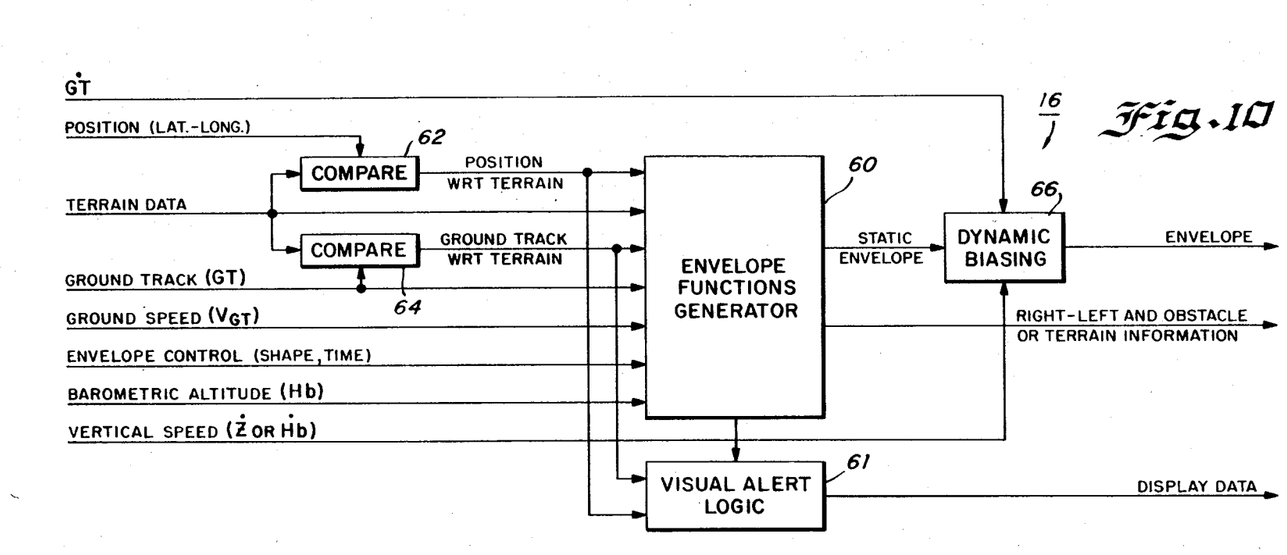
FIG. 10 is a block diagram of the predictive terrain/obstacle warning envelope generator illustrated in FIG. 1.

The predictive terrain/obstacle warning envelope generator 16 is illustrated in greater detail in FIG. 10. The envelope generator 16 contains an envelope function generator 60 that contains data defining the basic shapes of the various terrain features and obstacles, as well as the logic required to alter those shapes as a function of aircraft flying conditions. The envelope functions generator 60 receives signals representative of the position of the aircraft with respect to terrain from a comparator 62 that compares signals representative of the position of the aircraft from the flight management system 14 (FIG. 1). Terrain data received from the memory 18 via the location search logic 20 is used by the comparator 62 to determine the position of the aircraft with respect to terrain. The terrain data is also applied to the envelope functions generator 60, as is data representative of the ground track of the aircraft. A comparator 64 compares the terrain data with the ground track data to generate a signal representative of the ground track with respect to terrain and applies it to the envelope functions generator 60. Signals representative of the ground speed of the aircraft as well as its altitude above sea level are also applied to the envelope functions generator 60. An envelope control signal provides various control signals to the envelope functions generator such as, the shape of the terrain, i.e. whether the terrain is to be represented by a cone, a truncated cone, connected cones, etc. as well as the desired time to impact.

The envelope functions generator 60 operates on the received data to generate a static envelope which is modified by the descent rate of the aircraft and the rate of change of its ground track by a dynamic biasing circuit to provide a dynamic envelope. The static envelope generated by the envelope functions generator 60 is basically the envelope 54 described in conjunction with FIG. 7 and the vertical rate signal serves to raise the envelope as the aircraft descends and the ground track rate signal serves to adjust the orientation of the envelope to maintain a constant time to impact as a function of aircraft speed. Right left climb information is also generated by the envelope functions generator 60. Basically, the envelope functions generator 60 provides a "turn right" signal when Θ (FIG. 7) is positive and a "turn left" signal when Θ is negative.

A visual alert logic circuit 61 receives the position and ground track data from the comparators 62 and 64, as well as envelope data from the envelope functions generator 60 and operates on the received data to generate the display data that is applied to the attitude and map display generators 30 and 32 (FIG. 1), respectively. Such data could, for example, cause the position of the aircraft to be displayed with respect to the terrain. In addition, the display data could be used in conjunction with the signal from the comparator 24 to indicate a hazardous flight condition. Such a condition could be indicated by displaying a projected flight path into terrain, or by a change in the color of the terrain to a color such as red to indicate a hazardously close approach.

Figure 11:
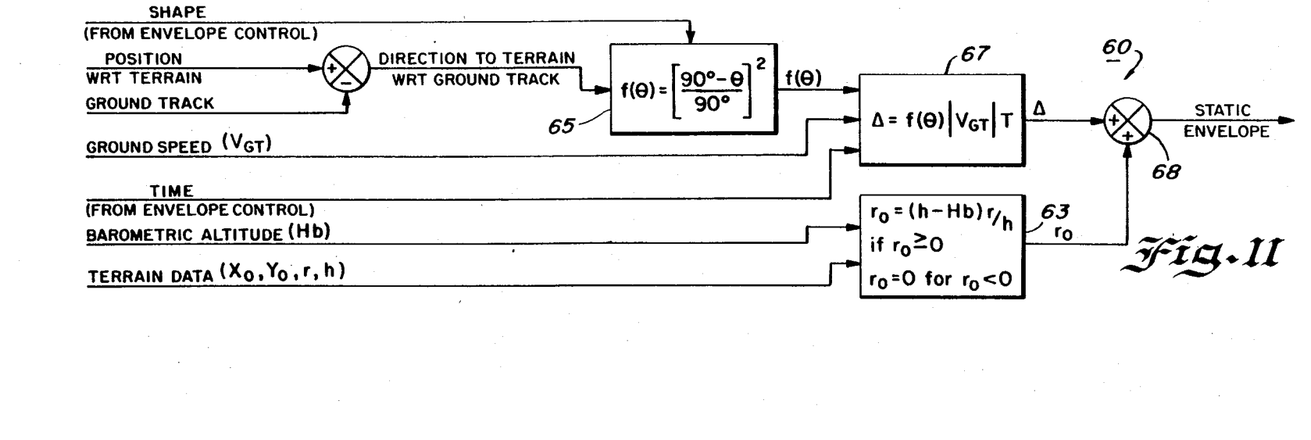
FIG. 11 is a block diagram of the envelope functions generator illustrated in FIG. 10.

The envelope functions generator 60 is illustrated in greater detail in FIG. 11. In the illustration of FIG. 11, equations for a cone function are illustrated, but the same principles apply to other shapes. The terrain data, $X_o$, $Y_o$, r and h defining a cone is applied to an arithmetic circuit 63 that solves the cone equation for the altitude at which the aircraft is flying, as determined by the altitude above sea level signal, in order to generate the radius $r_o$ at the altitude of the aircraft, as illustrated in FIG. 11.

Another arithmetic circuit 65 defines the shape of the envelope expansion 54 (FIG. 7) based on a signal representative of the desired shape of the envelope as well as a signal representative of the direction of the ground track of the aircraft with respect to terrain, which corresponds to the angle Θ of FIG. 7. The direction with respect to terrain is generated by comparing the angle of the aircraft with respect to terrain (δ in FIG. 7) with the angle of the ground track (φ in FIG. 7) to generate Θ. Alternatively, the ground track with respect to terrain (FIG. 10) signal may be applied to the arithmetic circuit 65. The unit 65 generates the shape of the expansion envelope and applies it to a scaling circuit 66 that alters the magnitude of the envelope as a function of the velocity of the aircraft and the desired time to impact. The output of the scaling circuit 67 as well as the output of the circuit 63 are combined in an adder 68 to generate the static envelope.

Figure 12:
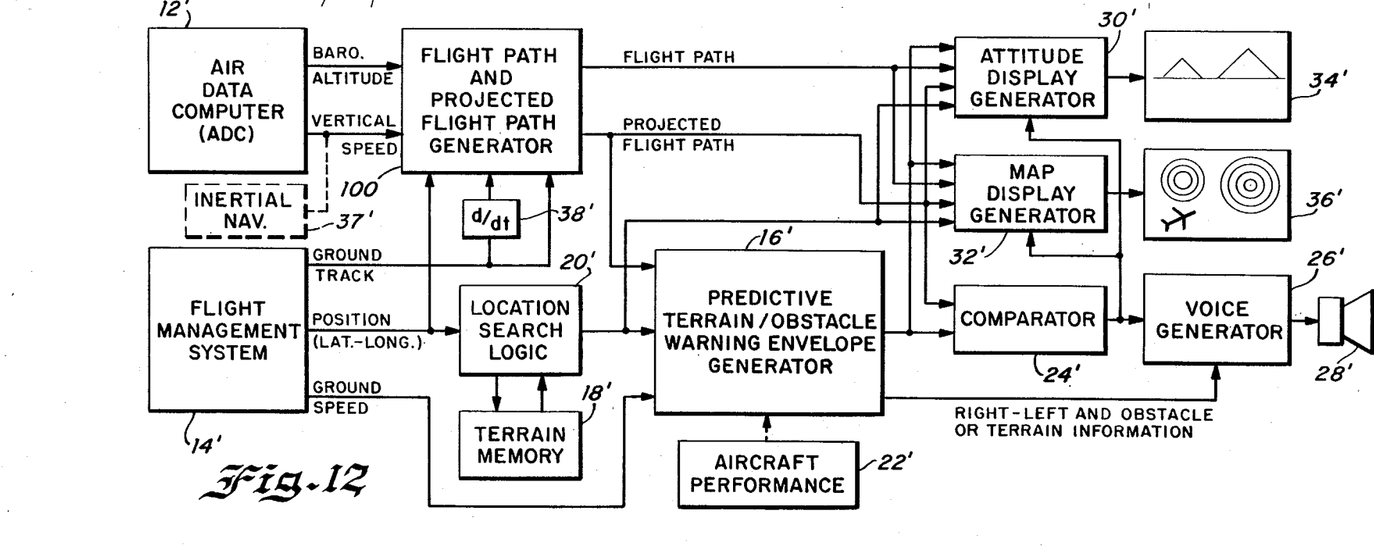
FIG. 12 is a block diagram of an alternative embodiment of the terrain advisory system according to the invention.

Referring to FIG. 12, there is shown an alternative embodiment of the system according to the invention. The system illustrated in FIG. 12 predicts the flight path of the aircraft and generates a warning if the predicted flight path should encounter an obstacle, as is illustrated in FIG. 6. Many of the components of the system illustrated in FIG. 12 are similar to those illustrated in FIG. 1, and consequently, will be assigned like reference numerals; however, such components will be designated by primed numbers in FIG. 12.

The system illustrated in FIG. 12 is similar to that illustrated in FIG. 1 with the exception of the addition of a flight path and projected path generator 100 which, based on signals representative of the altitude of the aircraft above sea level, its vertical speed, its position and ground track, as well as its rate of change of ground track determines the flight path and a projected flight path for a predetermined time forward. The flight path and projected flight path are displayed on the monitors 34' and 36', and a signal representative of the projected flight path is also applied to the warning envelope generator 16'. This envelope can be modified by terrain and speed considerations and compared by the comparator 24' to generate a voice warning.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A warning system for warning the operator of a vehicle of the location of obstacles in the path of travel, comprising:
   means for storing representations of the locations and physical characteristics of obstacles;
   means for determing the speed, position and direction of travel of said vehicle;
   means responsive to said storing means and to said determining means for defining safe approach boundaries between said vehicle and said obstacles as a function of the location and physical characteristics of said obstacles and for dynamically altering the sizes and shapes of said safe approach boundary as a function of the speed, position and direction of travel of the vehicle with respect to the obstacle; and
   means responsive to said determining means and to said defining means for generating a warning when the distance between the vehicle and the obstacle is less than the distance defined by the safe approach boundary.

2. A warning system as recited in claim 1 wherein said storing means includes means for storing approximations of the shapes and sizes of the obstacles.

3. The warning system recited in claim 2 wherein said shape approximations include cones and the sizes include the heights and slopes of said cones.

4. The warning system recited in claim 3 wherein said approximations include truncated cones.

5. The system recited in claim 3 wherein said approximations include connected cones.

6. The system recited in claim 3 wherein said approximations include inverted cones.

7. A warning system as recited in claim 1 wherein said defining means includes means for defining safe approach boundaries around said obstacles.

8. A warning system as recited in claim 1 wherein said defining means includes means for defining a safe approach boundary around said vehicle.

9. A warning system as recited in claim 1 wherein said defining means includes means for predicting the path of travel of said vehicle and for defining a safe approach boundary around said path of travel.

10. A warning system as recited in claim 9 wherein said predicting means includes means responsive to said speed, direction of travel and the rate of change of the direction of travel of said vehicle for predicting the path of travel of said vehicle.

11. A warning system as recited in claim 1 wherein said boundary defining means includes means for defining said boundary as a function of time to impact.

12. A warning system as recited in claim 11 wherein said boundary defining means includes means for defining said boundary as a constant time to impact boundary.

13. A warning system as recited in claim 1 further including means for advising the operator of the relative position of said vehicle and said obstacles.

14. A warning system as recited in claim 13 wherein said advising means includes a visual display.

15. A warning system as recited in claim 14 wherein said visual display is a color display, and wherein the color of the display changes as a function of the proximity of the vehicle to an obstacle.

16. A warning system as recited in claim 14 wherein said display is a map display.

17. A warning system as recited in claim 14 wherein said display is an attitude display.

18. A warning system as recited in claim 13 wherein said advising means includes means for providing an aural announcement.

19. A warning system as recited in claim 18 wherein said aural announcement providing means includes means for announcing to the operator the locations of the obstacle.

20. A warning system as recited in claim 18 wherein said aural announcement providing means includes means for announcing to the operator the corrective action to be taken.

21. A warning system for warning the operator of a vehicle of the location of obstacles in the path of travel, comprising:

means for storing representations of the locations and physical characteristics of obstacles;

means for determining the speed, position and direction of travel of said vehicle;

means responsive to said storing means and said determining means for defining safe approach boundaries between said vehicle and said obstacles as a function of the location and physical characteristics of said obstacles and the speed, position and direction of travel of the vehicle; and means responsive to said determining means and to said defining means for generating a warning when the distance between the vehicle and the obstacle is less than the distance defined by the safe approach boundary;

wherein said defining means includes means for defining safe approach boundaries around said obstacles and said obstacle is proximated by a cone and wherein said boundaries, $f(\theta)$, are defined by the equation:

$$f(\theta) = r_o + VT[(90-\theta)/90]$$

wherein:
$r_o$ = the radius of the cone at the altitude of the vehicle
$V$ = the velocity of the vehicle
$T$ = a function of the time to impact
$\theta$ = the angle between the path of travel and a straight line segment connecting the coordinates of the vehicle and the center coordinates of the cone.

22. A warning system for warning the operator of a vehicle of the location of obstacles in the path of travel, comprising:

means for storing representations of the locations and physical characteristics of obstacles;

means for determining the speed, position and direction of travel of said vehicle;

means responsive to said storing means and to said determining means for defining safe approach boundaries between said vehicle and said obstacles as a function of the location and physical characteristics of said obstacles and the speed, position and direction of travel of the vehicle; and means responsive to said determining means and to said defining means for generating a warning when the distance between the vehicle and the obstacle is less than the distance defined by the safe approach boundary;

wherein said defining means includes means for defining safe approach boundaries around said obstacles and said obstacle is approximated by a cone and wherein said boundaries, $f(\theta)$, are defined by the equation:

$$f(\theta) = r_o + VT[(90-\theta)/90]^2$$

wherein:
$r_o$ = the radius of the cone at the altitude of the vehicle
$V$ = the velocity of the vehicle
$T$ = a function of the time to impact
$\theta$ = the angle between the path of travel and a straight line segment connecting the coordinates of the vehicle and the center coordinates of the cone.

23. A warning system for warning the operator of a vehicle of the location of obstacles in the path of travel, comprising:

means for storing representations of the locations and physical characteristics of obstacles;

means for determining the speed, position and direction of travel of said vehicle;

means responsive to said storing means and to said determining means for defining safe approach boundaries between said vehicle and said obstacles as a function of the location and physical characteristics of said obstacles and the speed, position and direction of travel of the vehicle; and means responsive to said determining means and to said defining means for generating a warning when the distance between the vehicle and obstacle is less than the distance defined by the safe approach boundary;

wherein said defining means includes means for defining safe approach boundaries around said obstacles and said obstacle is approximated by a cone and wherein said boundaries, $f(\theta)$, are defined by the equation:

$$f(\theta) = r_o + VT[90-\theta/90]^{\frac{1}{2}}$$

wherein:
$r_o$ = the radius of the cone at the altitude of vehicle
$V$ = the velocity of the vehicle
$T$ = a function of the time to impact
$\theta$ = the angle between the path of travel and a straight line segment connecting the coordinates of the vehicle and the center coordinates of the cone.

24. A warning system for warning the operator of a vehicle of the location of obstacles in the path of travel, comprising:

means for storing representations of the locations and physical characteristics of obstacles;

means for determining the speed, position and direction of travel of said vehicle;

means responsive to said storing means and to said determining means for defining safe approach boundaries between said vehicle and said obstacles as a function of the location and physical characteristics of said obstacles and the speed, position and direction of travel of the vehicle; and means responsive to said determining means and to said defining means for generating a warning when the distance between the vehicle and the obstacle is less than the distance defined by the safe approach boundary;

wherein said defining means includes means for defining safe approach boundaries around said obstacles and said obstacle is approximated by a cone and wherein said boundaries, $f(\theta)$, are defined by the equation:

$$f(\theta) = r_o + VT \cos \theta$$

wherein:

$r_o$ = the radius of the cone at the altitude of the vehicle

V = the velocity of the vehicle

T = a function of the time to impact $\theta$ = the angle between the path of travel and a straight line segment connecting the coordinates of the vehicle and the center coordinates of the cone.

25. A warning system for warning the operator of a vehicle of the location of obstacles near the path of travel, comprising:

means for storing representations of the locations and physical characteristics of obstacles, said representations being stored as predetermined standard shapes and the locations and sizes thereof;

means for determining the speed, position and direction of travel of the vehicle and altering the shapes and sizes of said predetermined standard shapes as a function of speed, position and direction of travel of the vehicle to generate altered shapes; and means for providing an indication when the vehicle enters one of said altered shapes.

26. The system recited in claim 25 wherein said predetermined standard shapes are three dimensional shapes having horizontal and vertical components and wherein said vehicle is capable of moving horizontally and vertically, and wherein the horizontal and vertical components of the shapes are altered as a function of the horizontal and vertical movement of the vehicle, respectively.

27. The system recited in claim 25 wherein said standard shapes include geometric shapes.

28. The system as recited in claim 27 wherein said geometric shapes include cones having predetermined heights and radii, where the heights and radii of the cones are altered as a function of the horizontal and vertical movement of the vehicle, respectively.

29. The system recited in claim 27 wherein said geometric shapes include cones and the sizes include the heights and radii of said cones.

30. The system recited in claim 27 wherein said geometric shapes include truncated cones.

31. The system recited in claim 30 wherein said display is a map display.

32. The system recited in claim 27 wherein said geometric shapes include connected cones.

33. The system recited in claim 27 wherein said geometric shapes include inverted cones.

34. The system recited in claim 25 wherein said altered shape generating means includes means for defining safe approach boundaries around said obstacles.

35. The system recited in claim 25 wherein said altered shape generating means includes means for defining a safe approach boundary around the obstacle as a function of time to impact.

36. The system recited in claim 35 wherein said safe approach boundary defining means includes means for defining said boundary as a constant time to impact boundary.

37. The system recited in claim 25 further including means for advising the operator of the relative position of said vehicle and said obstacles.

38. The system recited in claim 37 wherein said advising means includes a visual display.

39. The system recited in claim 38 wherein said visual display is a color display, and wherein the color of the display changes as a function of the proximity of the vehicle to an obstacle.

40. The system recited in claim 38 wherein said display is an attitude display.

41. The system recited in claim 37 wherein said advising means includes means for providing an aural announcement.

42. The system recited in claim 41 wherein said aural announcement providing means includes means for announcing to the operator the locations of the obstacle.

43. The system recited in claim 41 wherein said aural announcement providing means includes means for announcing to the operator the corrective action to be taken.

44. A warning system for warning the operator of a vehicle of the location of obstacles near the path of travel, comprising:

means for storing representations of the locations and physical characteristics of obstacles, said representations being stored as predetermined standard shapes and the locations and sizes thereof;

means for determining the speed, position and direction of travel of the vehicle and altering shapes and sizes of said predetermined standard shapes as a function of speed, position and direction of travel of the vehicle to generate altered shapes; and means for providing an indication when the vehicle enters one of said altered shapes;

wherein the physical characteristics of an obstacle is approximated by a cone and wherein said boundaries, $f(\theta)$, are defined by the equation:

$$f(\theta) = r_o + VT[(90-\theta)/90]$$

wherein:

$r_o$ = the radius of the cone at the altitude of the vehicle

V = the velocity of the vehicle

T = a function of the time to impact $\theta$ = the angle between the path of travel and a straight line segment connecting the coordinates of the vehicle and the center coordinates of the cone.

45. A warning system for warning the operator of a vehicle of the location of obstacles near the path of travel, comprising:

means for storing representations of the locations and physical characteristics of obstacles, said representations being stored as predetermined standard shapes and the locations and sizes thereof;

means for determining the speed, position and direction of travel of the vehicle and altering the shapes and sizes of said predetermined standard shapes as a function of speed, position and direction of the travel of the vehicle to generate altered shapes; and means for providing an indication when the vehicle enters one of said altered shapes;

wherein the physical characteristics of an obstacle are approximated by a cone and wherein said boundaries, $f(\theta)$, are defined by the equation:

$$f(\theta) = r_o + VT[(90-\theta)/90]^2$$

wherein:
- $r_o$ = the radius of the cone at the altitude of the vehicle
- V = the velocity of the vehicle
- T = a function of the time to impact
- $\theta$ = the angle between the path of travel and a straight line segment connecting the coordinates of the vehicle and the center coordinates of the cone.

46. A warning system for warning the operator of a vehicle of the location of obstacles near the path of travel, comprising:

means for storing representations of the locations and physical characteristics of obstacles, said representations being stored as predetermined standard shapes and the locations and sizes thereof;

means for determining the speed, position and direction of travel of the vehicle and altering the shapes and sizes of said predetermined standard shapes as a function of speed, position and direction of travel of the vehicle to generate altered shapes; and means for providing an indication when the vehicle enters one of said altered shapes; wherein the physical characteristics of an obstacle is approximated by a cone and wherein said boundaries, $f(\theta)$, are defined by the equation:

$$f(\theta) = r_o + VT[90-\theta/90]^{\frac{1}{2}}$$

wherein:
- $r_o$ = the radius of the cone at the altitude of the vehicle
- V = the velocity of the vehicle
- T = a function of the time to impact
- $\theta$ = the angle between the path of travel and a straight line segment connecting the coordinates of the vehicle and the center coordinates of the cone.

47. A warning system for warning the operator of a vehicle of the location of obstacles near the path of travel, comprising:

means for storing representations of the locations and physical characteristics of obstacles, said representations being stored as predetermined standard shapes and the locations and sizes thereof;

means for determining the speed, position and direction of travel of the vehicle and altering the shapes and sizes of said predetermined standard shapes as a function of speed, position and direction of travel of the vehicle to generate altered shapes; and means for providing an indication when the vehicle enters one of said altered shapes; wherein the physical characteristics of an obstacle is approximated by a cone and wherein said boundaries, $f(\theta)$, are defined by the equation:

$$f(\theta) = r_o + VT \cos\theta$$

wherein:
- $r_o$ = the radius of the cone at the altitude of the vehicle
- V = the velocity of the vehicle
- T = a function of the time to impact
- $\theta$ = the angle between the path of travel and a straight line segment connecting the coordinates of the vehicle and the center coordinates of the cone.

48. A warning system for providing a warning to the operator of a vehicle a predetermined time prior to a projected impact with an obstacle, comprising:

means for storing data representative of the location and boundaries of the obstacles;

means for determining the velocity, direction of travel and position of the vehicle;

means responsive to said data storing means and to said determining means for defining warning boundaries between the vehicle and said obstacles, said warning boundaries being a function of the location and boundaries of said obstacles and the velocity of said vehicle said boundary defining means including means for dynamically altering the shapes of said warning boundaries as a function of the direction of travel of the vehicle with respect to the obstacle; and means for generating a warning when one of said boundaries is penetrated.

49. A warning system as recited in claim 48 wherein said warning boundaries define a predetermined time to impact.

50. A warning system as recited in claim 49 wherein said warning boundaries define a constant time to impact.

51. A warning system as recited in claim 48 wherein said storing means includes means for storing approximations of the shapes and sizes of the obstacles.

52. A warning system as recited in claim 51 wherein said approximations include algebraic approximations.

53. A warning system as recited in claim 51 wherein said approximations include geometric approximations.

54. The warning system recited in claim 53 wherein said geometric approximations include cones and the sizes include the heights and slopes of said cones.

55. The warning system recited in claim 53 wherein said geometric approximations include truncated cones.

56. The system recited in claim 53 wherein said geometric approximations include connected cones.

57. The system recited in claim 53 wherein said approximations include inverted cones.

58. A warning system as recited in claim 48 wherein said defining means includes means for defining safe approach boundaries around said obstacles.

59. A warning system as recited in claim 48 wherein said defining means includes means for defining a safe approach boundary around said vehicle.

60. A warning system as recited in claim 48 wherein said defining means includes means for predicting the path of travel of said vehicle and for defining a safe approach boundary around said path of travel.

61. A warning system as recited in claim 60 wherein said predicting means includes means responsive to said speed, direction of travel and the rate of change of the direction of travel of said vehicle for predicting the path of travel of said vehicle.

62. A warning system as recited in claim 48 wherein said warning boundary defining means includes means for defining said boundary as a function of time to impact.

63. A warning system as recited in claim 62 wherein said warning boundary defining means includes means for defining said warning boundary as a constant time to impact boundary.

64. A warning system as recited in claim 48 further including means for advising the operator of the relative position of said vehicle and said obstacles.

65. A warning system as recited in claim 64 wherein said advising means includes a visual display.

66. A warning system as recited in claim 65 wherein said visual display is a color display, and wherein the color of the display changes as a function of the proximity of the vehicle to an obstacle.

67. A warning system as recited in claim 65 wherein said display is a map display.

68. A warning system as recited in claim 65 wherein said display is an attitude display.

69. A warning system as recited in claim 64 wherein said advising means includes means for providing an aural announcement.

70. A warning system as recited in claim 69 wherein said aural announcement providing means includes means for announcing to the operator the locations of the obstacle.

71. A warning system as recited in claim 69 wherein said aural announcement providing means includes means for announcing to the operator the corrective action to be taken.

72. A warning system for providing a warning to the operator of a vehicle a predetermined time prior to the projected impact with an obstacle, comprising:
means for storing data representative of the location and boundaries of obstacles;
means for determining the velocity and position of the vehicle;
means responsive to said data storing means and said determining means for defining warning boundaries between the vehicle and said obstacles, said warning boundaries being a function of location and boundaries of said obstacles and the position and velocity of said vehicle; and
means for generating a warning when one of said warning boundaries is penetrated; wherein said defining means includes means for defining safe approach boundaries around said obstacles and said obstacle is approximated by a cone and wherein said boundaries, f($\theta$), are defined by the equation:

$$f(\theta) = r_o + VT[(90-\theta)/90]$$

wherein:
$r_o$ = the radius of the cone at the altitude of the vehicle
V = the velocity of the vehicle
T = a function of the time to impact
$\theta$ = the angle between the path of travel and a straight line segment connecting the coordinates of the vehicle and the center coordinates of the cone.

73. A warning system for providing a warning to the operator of a vehicle a predetermined time prior to a projected impact with an obstacle, comprising:
means for storing data representative of the location and boundaries of obstacles;
means for determining the velocity and position of the vehicle;
means responsive to said data storing means and said determining means for defining warning boundaries between the vehicle and said obstacles, said warning boundaries being a function of location and boundaries of said obstacles and the position and the velocity of said vehicle; and
means for generating a warning when one of said warning boundaries is penetrated; wherein said defining means includes means for defining safe approach boundaries around said obstacles and said obstacle is approximated by a cone and wherein said boundaries, f($\theta$), are defined by the equation:

$$f(\theta) = r_o + VT[(90-\theta)/90]^2$$

wherein:
$r_o$ = the radius of the cone at the altitude of the vehicle
V = the velocity of the vehicle
T = a function of the time to impact
$\theta$ = the angle between the path of travel and a straight line segment connecting the coordinates of the vehicle and the center coordinates of the cone.

74. A warning system for providing a warning to the operator of a vehicle a predetermined time prior to the projected impact with an obstacle, comprising:
means for storing data representative of the location and boundaries of obstacles;
means for determining the velocity and position of the vehicle;
means responsive to said data storing means and said determining means for defining warning boundaries between the vehicle and said obstacles, said warning boundaries being a function of the location and boundaries of said obstacles and the position and velocity of said vehicle; and
means for generating a warning when one of said warning boundaries is penetrated; wherein said defining means includes means for defining safe approach boundaries around said obstacles and said obstacle is approximated by a cone and wherein said boundaries, f($\theta$), are defined by the equation:

$$f(\theta) = r_o + VT[90-\theta/90]^{\frac{1}{2}}$$

wherein:
$r_o$ = the radius of the cone at the altitude of the vehicle
V = the velocity of the vehicle
T = a function of the time to impact
$\theta$ = the angle between the path of travel and a straight line segment connecting the coordinates of the vehicle and the center coordinates of the cone.

75. A warning system for providing a warning to the operator of a vehicle a predetermined time prior to a projected impact with an obstacle, comprising:
means for storing data representative of the location and boundaries of obstacles;
means for determining the velocity and position of the vehicle;
means responsive to said data storing means and said determining means for defining warning boundaries between the vehicle and said obstacles, said warning boundaries being a function of the location and boundaries of said obstacles and the position and velocity of said vehicle; and means for generating a warning when one of said warning boundaries is penetrated; wherein said defining means includes means for defining safe approach boundaries around said obstacles and said obstacle is approximated by a cone and wherein said boundaries, f(θ), are defined by the equation:

$$f(\theta) = r_o + VT \cos [\text{ COS }]\theta$$

wherein:
$r_o$ = the radius of the cone at the altitude of the vehicle
V = the velocity of the vehicle
T = a function of the time to impact
θ = the angle between the path of travel and a straight line segment connecting the coordinates of the vehicle and the center coordinates of the cone.

76. A warning system for warning the operator of a vehicle of the location of restricted areas in the path of travel, comprising:

means for storing representations of the locations of restricted areas;
means for determining the speed, position and direction of travel of said vehicle;
means responsive to said storing means and to said determining means for defining dynamic safe approach boundaries between said vehicle and said restricted areas as a function of the location of said restricted areas and the speed and direction of travel of the vehicle and for altering said dynamic safe approach boundary as a function of the position and direction of travel of the vehicle with respect to the restricted area; and
means responsive to said determining means and to said defining means for generating a warning when the distance between the vehicle and the restricted area is less than the distance defined by the safe approach boundary.

77. A warning system as recited in claim 76 wherein said storing means includes means for storing approximations of the shapes and sizes of the restricted areas.

* * * * *